US009485680B2

(12) United States Patent
Diebenbusch et al.

(10) Patent No.: US 9,485,680 B2
(45) Date of Patent: Nov. 1, 2016

(54) TEST APPARATUS AND METHOD FOR TESTING IP-BASED MOBILE COMMUNICATIONS TERMINALS

(71) Applicant: Rohde & Schwarz GmbH & Co. KG, Munich (DE)

(72) Inventors: Stefan Diebenbusch, Furstenfeldbruck (DE); Klaus Degner, Leipzig (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 53 days.

(21) Appl. No.: 14/169,374

(22) Filed: Jan. 31, 2014

(65) Prior Publication Data
US 2014/0219123 A1 Aug. 7, 2014

(30) Foreign Application Priority Data

Feb. 1, 2013 (DE) .................. 10 2013 201 688

(51) Int. Cl.
H04L 12/26 (2006.01)
H04W 24/08 (2009.01)
H04W 80/04 (2009.01)

(52) U.S. Cl.
CPC ............. *H04W 24/08* (2013.01); *H04L 43/08* (2013.01); *H04L 43/50* (2013.01); *H04W 80/04* (2013.01)

(58) Field of Classification Search
USPC ......... 370/231–252, 310–352; 455/422–562; 709/224–241
See application file for complete search history.

(56) References Cited

U.S. PATENT DOCUMENTS

| 7,339,891 | B2 * | 3/2008 | Binder ................ H04L 12/2697 370/231 |
| 7,573,825 | B2 * | 8/2009 | Iffland ................. H04L 12/2697 370/241 |
| 8,028,188 | B2 * | 9/2011 | Karthikeyan ....... H04L 12/2697 455/423 |
| 8,620,305 | B2 * | 12/2013 | Singh .................... H04W 24/06 455/422.1 |
| 8,811,196 | B2 * | 8/2014 | Huq ........................ H04L 43/50 370/252 |
| 9,088,430 | B2 * | 7/2015 | Huq .................... H04L 12/2697 |
| 2003/0156549 | A1 | 8/2003 | Binder et al. |
| 2005/0078618 | A1 * | 4/2005 | Woo ...................... H04W 88/08 370/310.1 |

(Continued)

FOREIGN PATENT DOCUMENTS

DE 10 2008 010 300 A1 3/2009
DE 10 2008 062 611 A1 6/2009

(Continued)

OTHER PUBLICATIONS

German Search Report for German Patent Application No. DE 10 2013 201 688.3, dated Sep. 4, 2013, 6 pages.

(Continued)

*Primary Examiner* — Man Phan
(74) *Attorney, Agent, or Firm* — Westman, Champlin & Koehler, P.A.

(57) ABSTRACT

The present invention relates to a test apparatus and method for testing IP-based mobile communications terminals. The test apparatus comprises a first communications interface via which the test apparatus can be connected to the Internet, a second communications interface via which the test apparatus can be connected to an IP-based mobile communications terminal under test, and a test unit, which is designed to test IP-based applications provided in a mobile communications terminal under test that is connected to the Internet via the first and second communications interfaces.

13 Claims, 3 Drawing Sheets

(56) References Cited

U.S. PATENT DOCUMENTS

| | | | |
|---|---|---|---|
| 2007/0002753 A1* | 1/2007 | Bailey | H04L 43/50 370/241 |
| 2008/0261632 A1* | 10/2008 | Hind | H04L 51/14 455/466 |
| 2009/0005119 A1* | 1/2009 | Patel | H04W 24/10 455/562.1 |
| 2009/0307531 A1 | 12/2009 | Karthikeyan et al. | |
| 2011/0138002 A1* | 6/2011 | Park | H04L 12/581 709/206 |
| 2012/0155292 A1 | 6/2012 | Zazula et al. | |
| 2014/0258504 A1* | 9/2014 | Kahkoska | H04L 43/50 709/224 |

FOREIGN PATENT DOCUMENTS

| | | |
|---|---|---|
| GB | 2 398 456 A | 8/2004 |
| WO | 2009/105576 A1 | 8/2009 |

OTHER PUBLICATIONS

German Office Action for German Patent Application No. 10 2013 201 688.3, dated Nov. 9, 2015, 7 pages.

* cited by examiner

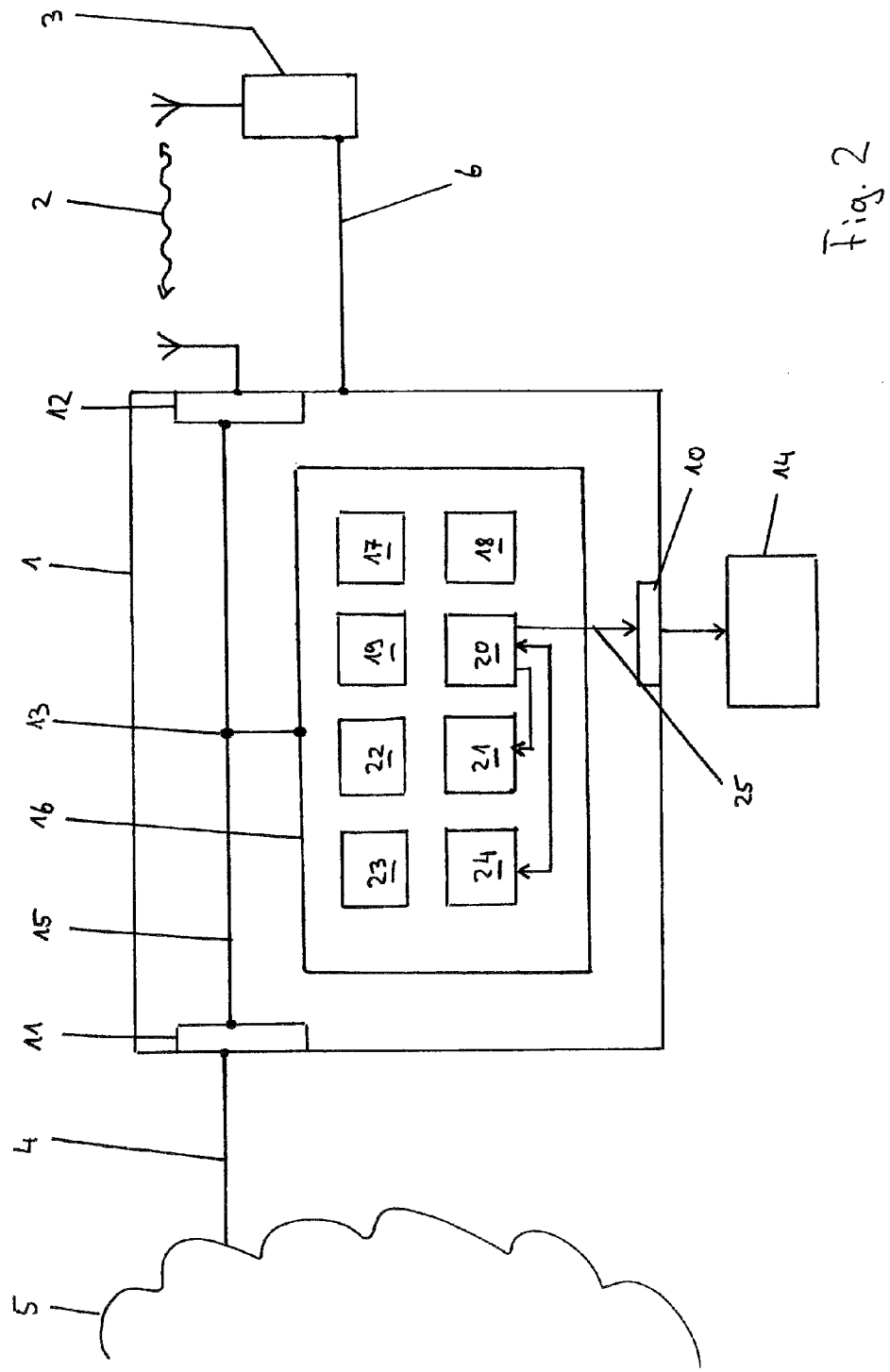

| TCP Flow ID | Throughput | TCP WINDOW | Retrans-mission | Overhead |
|---|---|---|---|---|
| 1 | 50kbits/s | OK | OK | OK |
| 2 | 150kbits/s | FULL | OK | OK |
| 3 | 10Mbits/s | OK | OK | OK |
| 4 | 0,01kbits/s | FULL | NOK | OK |
| ... | ... | ... | ... | ... |

TEST APPARATUS AND METHOD FOR TESTING IP-BASED MOBILE COMMUNICATIONS TERMINALS

CROSS-REFERENCE TO RELATED APPLICATION

This application is a non-provisional application of German Application No. DE 10 2013 201 688.3, filed Feb. 1, 2013 in German, the contents of which are hereby incorporated by reference in their entirety.

FIELD OF THE INVENTION

The present invention relates to a test apparatus and a method for testing IP-based mobile communications terminals.

TECHNICAL BACKGROUND

The growing functionality of modern mobile communications terminals means that testing these devices is becoming increasingly important. If a mobile communications terminal is tested in the real mobile communications network, the conditions are often not reproducible because the limiting conditions such as cell capacity, timing, utilisation etc. can change continuously. In this respect it makes sense to test mobile communications terminals in a reproducible test network. Dedicated test apparatus for testing mobile communications terminals exists for this purpose. DE 10 2008 010 300 A1, for example, describes the operating principle of a test apparatus of this type.

Such a test apparatus is in principle an RF test station, which is a modified small base station of a mobile communications network. The test apparatus can generate a specific test network according to the required mobile communications standard such as for example a GSM, UMTS or LTE network, so that the test can be performed very realistically. This type of test apparatus is used in order to test the RF properties, for instance the transmit and receive capability, of mobile communications terminals.

In modern mobile telephony, the trend is towards smartphones, tablet PCs and the like. Such smartphones differ from conventional mobile communications terminals in that they have a greater computer functionality and connectivity than a conventional advanced mobile phone. A characteristic feature of smartphones is the facility for IP-based communication (communication based on the Internet protocol). Thus this facility typically enables access to the Internet, which access is normally made via WLAN or mobile broadband. A communications link to the Internet is therefore established immediately after a smartphone is switched on. The large number of applications available on the smartphone and the requirement for the smartphone to be constantly reachable over an IP-based communications link place entirely new demands on the test environment and the test apparatus used for this.

Although it is also the case that the RF properties of such smartphones are tested, i.e. the mobile communications properties of these smartphones are tested, smartphones additionally have a large number of different "applications" as they are called. These applications refer to user software on the smartphone that is available via the Internet, and hence when activated requires Internet communication to be established.

Manufacturers of such smartphones, and if applicable also the network operators or developers of IP-based applications, usually verify whether a particular smartphone is behaving as required, for example with regard to data throughput, data volume, communications partners (servers), etc. This verification, however, still does not provide any information about how the smartphone behaves under real conditions, i.e. when using this application under different limiting conditions.

This is a situation that needs to be improved.

SUMMARY OF THE INVENTION

Against this background, the object of the present invention is to improve the testing of modern mobile communications terminals.

This object is achieved by a test apparatus and methods in accordance with embodiments of the invention.

Accordingly it is provided:

A test apparatus for testing IP-based mobile communications terminals comprising: a first communications interface via which the test apparatus can be connected to the Internet; a second communications interface via which the test apparatus can be connected to an IP-based mobile communications terminal under test; and a test unit, which is designed to test IP-based applications provided in a mobile communications terminal under test that is connected to the Internet via the first and second communications interfaces;

A method for testing IP-based mobile communications terminals, the method comprising: providing an IP-based mobile communications terminal under test which contains at least one IP-based application; providing a test apparatus for testing the mobile communications terminal; testing the RF properties of the mobile communications terminal and using the test apparatus to evaluate the first test results obtained in said test; testing the at least one IP-based application provided in the mobile communications terminal and using the test apparatus to evaluate the second test results obtained in said test; correlating the first evaluated test results with the second evaluated test results.

The present invention is based on the concept of connecting a test apparatus both to the Internet and also, for instance over an RF link, to a mobile communications terminal in order to be able to perform comprehensive testing of the mobile communications terminal. The test apparatus according to the invention effectively acts here as an observer of an IP-based communications link between the mobile communications terminal under test and the Internet. The IP functionality of the mobile communications terminal under test can be tested in this way.

Advantageous embodiments and developments are given in the further subclaims and in the description with reference to the figures in the drawing.

In a preferred embodiment, the test unit comprises an RF measurement/evaluation unit, which is designed to test the RF properties of the mobile communications terminal connected to the test apparatus via the second communications interface. The test apparatus according to the invention can preferably support a multiplicity of different protocols from mobile communications standards such as, for instance, GSM, CDMA (W-CDMA, CDMA 2000, etc.), UMTS, LTE, etc. This provides very advantageously a single test apparatus that can test both the RF properties of a mobile communications terminal, i.e. the mobile communications properties of same, and the IP applications available on the mobile communications terminal. In the test apparatus according to the invention, the IP analysis can thus be combined with separate RF measurements carried out in parallel.

The test unit of the test apparatus according to the invention is advantageously designed to test the behaviour of an IP-based mobile communications terminal under test under various underlying conditions. Underlying conditions can be, for example, different mobile communications networks for different mobile operators, different mobile communications standards (GSM, UMTS, LTE etc.), field strength of a mobile communications network being used, interference in the data transfer, number of activated IP applications in a mobile communications terminal etc. Whilst it was hitherto only possible to test under laboratory conditions the functionality of an IP-based mobile communications terminal, in other words applications provided thereon, it is now possible to test same under real conditions for example under varying underlying conditions and parameters. With the constantly increasing number of IP applications in a mobile communications terminal that are available and used, it is thus possible to optimise the functionality of this mobile communications terminal back at a very early stage, in particular with regard to power analysis and optimisation.

The test unit preferably comprises a measurement unit that is designed to measure various information and parameters for a mobile communications terminal under test that is connected to the Internet. In particular, the measurement unit is provided, for example, to determine the number of IP-based communications links established by the mobile communications terminal under test. In addition, the number of IP communications links per specific application can be determined, i.e. for each active application, the respective number of IP communications links established for this application is determined. In addition, it would also be possible to measure the power consumption in the mobile communications terminal resulting from an active IP application in the mobile communications terminal under test. This power consumption can be measured, for example, for a specified time period. Additionally or alternatively, it would also be possible to determine the power consumption of the mobile communications terminal for a specified data volume, a specified number of transferred data packets or the like. Additionally or alternatively, the measurement unit is designed to measure the data volume that was received and/or transmitted by an active IP application in the mobile communications terminal under test, for example over a specified time period.

In a particularly advantageous embodiment, correlation between the parameters and information measured or determined in this way is carried out as required. The term correlation or correlating is used here and in the entire patent application to denote the process in which a relationship is established between two or more measured or calculated parameters, variables or states, wherein there need not necessarily be a causal relationship between the parameters, variables or states that are correlated with one another.

For example, it could be provided that the data volume is evaluated over a defined time period and correlated in a suitable way with the power consumption of the mobile communications terminal. Alternatively, it would also be possible to analyse over a defined time period the number of established IP communications links and to correlate same with the power consumption of the mobile communications terminal. It would also be possible to correlate, for example over a defined time period, the evaluation of the established IP communications links with the RF resources required for this in the mobile communications network.

In a preferred embodiment, the test unit comprises at least one standalone server unit. At least one of these standalone server units is designed to simulate in-device the function of a communications partner of the mobile communications terminal under test, which partner is assigned to a particular IP application. A standalone server unit shall be understood to mean a piece of self-contained hardware or software that simulates the functionality of an Internet communications partner (or server) assigned on the mobile communications terminal to a particular IP application. For example, the standalone server unit can be designed to simulate at least one of the following IP applications: VoIP (Voice over Internet Protocol), FTP (File Transfer Protocol), HTTP (HyperText Transfer Protocol), MMS (Microsoft MediaServer). In addition, it would also be possible to simulate inside the test unit other protocols, services, applications in the form of standalone server units. It is obvious, however, that the standalone server unit is not capable of simulating the multiplicity of existing applications, and therefore the standalone server unit typically does not simulate a range of IP applications. Instead, these applications are tested under real conditions by connecting the mobile communications terminal to the Internet.

In a particularly preferred embodiment, the test unit comprises an analysis and/or evaluation unit. This analysis and/or evaluation unit is designed to analyse and/or evaluate on the basis of specified parameters the signal sequences captured in a data transfer between a mobile communications terminal under test and the Internet. The test, i.e. the capture of the signal sequences and evaluation of the captured signal sequences, is preferably performed passively, i.e. in particular without modifying the contents and data of the captured signal sequences. Thus the signal sequences are routed from the mobile communications terminal via the test apparatus according to the invention to the Internet without data manipulation or impact on the signal, and/or are routed from the Internet to the currently addressed mobile communications terminal similarly without data manipulation or impact on the signal. The test apparatus and hence the analysis and/or evaluation unit present in the test apparatus thus act effectively only as observers without influencing the data transfer. A test under real conditions is thereby achieved.

A signal sequence of a data transfer between an IP-based mobile communications terminal under test and the Internet typically comprises data packets. The evaluation unit according to the invention is now designed to extract these data packets from a particular signal sequence and to evaluate, for instance on the basis of defined parameters, the data packets extracted in this way. The structure of the signal sequence of a data transfer can be evaluated and analysed by this means.

The defined parameters may be, for example, the data throughput of a data transfer, the data volume of a data transfer and/or the type and number of the communications partners used on one data transfer. It is particularly advantageous if the communications protocols employed in different OSI layers are used as the defined parameters for the evaluation and analysis.

A particular data packet of an IP-based signal sequence typically comprises a header and a data field. The data field contains the actual data for the data transfer. The header contains the relevant control information. Depending on the protocol used for the data transfer, the header can contain, for instance, address information that indicates the source address and destination address for a data transfer. The header can additionally contain protocol data, information about the file size, routing data, information about the protocol used by the communications partner, an http server ID, user agent ID, MIME type and the like. For the evaluation and analysis, the evaluation unit can be used very advantageously to evaluate the contents of the header and correlate same with the data transfer, for example by placing the header in context with the amount of data in the data field or with the length of the data field. The length of the header is typically fixed. A data field, however, is often flexible, and the length of a data field is defined in the header. The longer a data field with respect to the header, the more efficient the data transfer. Thus this type of evaluation can be used to assess the efficiency of a data transfer by relating the amount of data required for the header to the data contained in the data field. Furthermore, it would also be possible to determine a data loss or data corruption and place it in context with a data transfer.

It is particularly advantageous if a power analysis of a data transfer is performed for different OSI layers. For instance, a power analysis of communications links could be performed for layer 3 (IP), for layer 4 (TCP, UDP) and/or for layer 7 (e.g. HTTP, FTP) incorporating influencing factors of the mobile communications network.

In a particularly preferred embodiment, the test unit comprises a selection unit. This selection unit is designed to make a selection of the test parameters obtained during the test. Preferably those test parameters that are particularly informative are selected here, such as for instance data loss, retransmission, overhead and the like, which are particularly suitable for deriving visual information therefrom. The test unit further comprises a visual output unit, which is designed for the visual output or display of the analysis data assigned on the basis of the selected test parameters. By means of this visual output unit, which, for instance, may be in the form of a display or in the simplest case LED lamps, it is very easily possible to obtain already in situ, i.e. while test mode is in progress, conclusions about the progress of the test. In particular in this case, it is possible to intervene in the tests back at a very early stage in order to adapt or modify, for instance, the test conditions and test parameters to suit requirements. Additionally or alternatively, it would also be possible to output analysis data acoustically or in printed form.

In a further embodiment, the test unit comprises a third communications interface, for example in the form of an external interface. A device-external unit, such as an external processing unit, can be connected to the test apparatus according to the invention via the third communications interface. The captured test data and/or analysis data, which may already exist in pre-analysed form, can be routed as required to the connected processing unit via the third communications interface. Furthermore, it would also be possible for this test data or analysis data to be processed while still inside the test apparatus.

The test unit preferably comprises a protocol tester, which is designed to test the protocols of various active IP applications. It is particularly preferred if the protocol tester is designed to test a small number of IP protocols such as IPv4, IPv6 and/or IPv4/6 for instance.

In a further, likewise particularly preferred embodiment, the test unit comprises a simulation unit. This simulation unit is designed to simulate various test scenarios during testing of a mobile communications terminal. In particular, data packet losses, jitter, fading etc. exist under real conditions. In order to be able to test also such entirely real scenarios, the simulation unit advantageously simulates these test scenarios. For this purpose, for instance, a data packet loss can be simulated artificially in order to derive therefrom how the mobile communications terminal reacts to these data packet losses and/or what effects these data packet losses have on the performance and functionality of the mobile communications terminal. Furthermore, from the same motivation it is possible to superimpose an interference signal artificially on the transmitted signal sequence during a data transfer, or to apply a "jitter" signal to the transmitted signal sequence. A further simulation option would be what is known as "fading", in which the test apparatus, or more precisely the simulation unit contained therein, simulates a deliberate variation in the receive field strength. Of course this is not a complete list but is intended simply by way of example. By simulating different test scenarios, it is possible to test the mobile communications terminal and the IP applications that can be activated by this terminal with respect to the widest range of real conditions.

In a particularly preferred embodiment, the test unit is designed to activate actively an IP-based mobile communications terminal under test in order thereby to activate selectively a relevant IP application on the mobile communications terminal. In addition, however, it would also be possible that the test unit works completely passively, and that during testing, the various IP applications in the mobile communications terminal are activated in a different way, for example manually via a suitable input mechanism on the mobile communications terminal.

Testing of a mobile communications terminal advantageously takes place as early as the development stage of the relevant mobile communications terminals, because in this case it is also possible at a very early stage to intervene in any development which may have gone wrong, or to optimise the performance and functionality both of the mobile communications terminal and the IP applications used thereon. Since in modern mobile communications terminals such as smartphones or tablet PCs, a multiplicity of widely differing IP applications can be tested, it is obvious that corresponding complete tests can be very time-consuming. For this reason, the present test apparatus according to the invention is preferably suitable for use during the development phase of such mobile communications terminals. In an appropriately "slimmed-down" form, however, it would also be possible to use the test apparatus according to the invention also in the production line during the manufacture of mobile communications terminals or, for instance, also for final inspection.

In a particularly preferred embodiment, the test apparatus and here in particular the evaluation unit, selection unit and/or measurement unit provided therein, are part of a program-controlled device, for example a microcontroller, microcomputer or the like.

In a particularly preferred embodiment of the method according to the invention, the step of testing the RF properties of the mobile communications terminal and the step of testing the IP-based applications provided in the mobile communications terminal are performed simultaneously.

The above embodiments and developments can, where practical, be combined with one another in any way. Further possible embodiments, developments and implementations of the invention also include combinations that have not been mentioned explicitly of features of the invention described above or below in relation to the embodiments. In particular, a person skilled in the art will also add individual aspects as improvements or additions to the particular basic form of the present invention.

CONTENTS OF THE DRAWING

The present invention is described in greater detail below with reference to the embodiments presented in the schematic figures of the drawings, in which:

FIG. 2 shows a block diagram for explaining the functionality of a test apparatus according to the invention;

FIG. 4 shows an example of the output of a power analysis result using a visual output unit.

Figure 1:
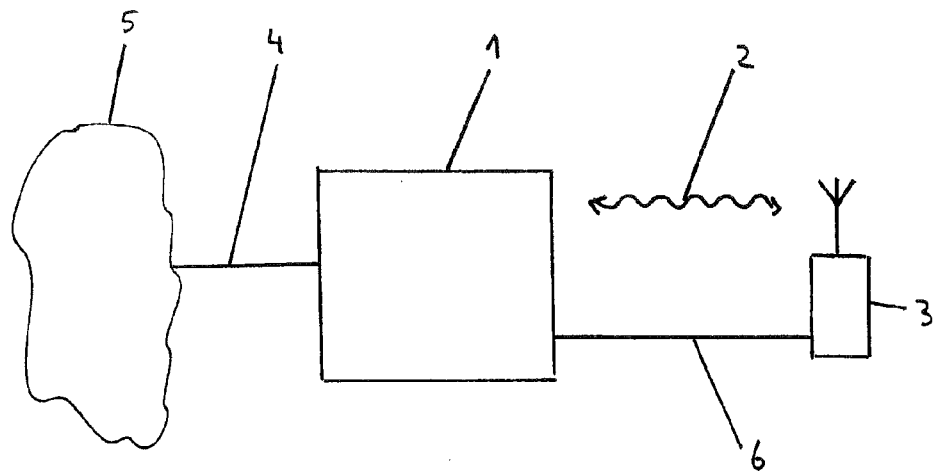
FIG. 1 shows a schematic diagram of the test setup for testing an IP-based mobile communications terminal using a test apparatus according to the invention.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DESCRIPTION OF THE EMBODIMENTS

FIG. 1 shows a schematic diagram of the test setup for testing a mobile communications terminal using a test apparatus according to the invention. in FIG. 1, the test apparatus according to the invention is denoted by reference sign 1. This test apparatus 1 constitutes a test station, which can also be referred to as an RF tester or mobile communications tester. In addition to testing the pure mobile communications properties, the test apparatus 1 according to the invention is designed to test IP properties of a mobile communications terminal.

The test apparatus 1 is wirelessly connected by a communications link to the mobile communications terminal 3 (or DUT=Device Under Test) via a radio interface 2. The communications standard used here is typically defined by the mobile communications terminal 3. The communications link between the test apparatus 1 and the mobile communications terminal 3 allows a bidirectional signal transfer between the two components of the test system. It would also be possible, however, for a hard-wired communications link 6 to exist between the test apparatus 1 and the mobile communications terminal 3 under test. Via this hard-wired communications link 6, it is possible for the test apparatus 1, for instance, to activate the mobile communications terminal 3.

In addition, the test apparatus 1 according to the invention is connected via a hard-wired communications link 4 to the Internet 5 or, for instance, also to another data network. This communications link 4 can be a DSL connection, for example.

A mobile communications terminal 3 under test is thus connected to the Internet 5 via the radio interface 2, the test apparatus 1 and the DSL connection 4. By means of this connection of mobile communications terminal 3 and Internet 5, the test apparatus 1 according to the invention can test and evaluate the IP properties of the mobile communications terminal 3 and in particular the IP applications available in the mobile communications terminal 3. In this test and/or this evaluation, in particular the interaction between the IP application being used and the physical properties of the mobile communications terminal 3 is tested according to which underlying conditions the mobile communications terminal 3 is being operated under.

To test the pure mobile communications properties of the mobile communications terminal 3, it is merely necessary that the test apparatus 1 is connected to the mobile communications terminal 3 via the radio interface 2. In test mode, the test apparatus 1 according to the invention generates an RF test field in which the mobile communications terminal 3 is positioned.

Communication between mobile communications terminal 3 and test apparatus 1 can be initiated by the mobile communications terminal 3 or by the test apparatus 1.

FIG. 2 shows a block diagram for illustrating the functionality of a test apparatus 1 according to the invention. The test apparatus 1 according to the invention in the present embodiment has three interfaces 10, 11, 12. The first interface 11 is connected internally via a direct connecting line 15 to the second interface 12. Whilst the test apparatus 1, as already explained with reference to FIG. 1, can be connected to the Internet 5 via the first interface 11 and is wirelessly connected to the mobile communications terminal 3 under test via the second interface 12, a third interface 10 is provided, via which the test apparatus 1 is connected to a device-external processing unit 14, for example a computer.

The test apparatus 1 according to the invention comprises a test unit 16. In the example shown, the test unit 16 is connected at a terminal 13 to the connecting line 15. By this means, it is possible for the test unit 16 to be able to act merely as an observer and hence not affect the signals transferred in a data transfer between mobile communications terminal 3 under test and Internet 5.

The test unit 16, the functions of which are presented in detail below, comprises in the example shown at least the following functional units 17-24:
RF measurement and evaluation unit 17;
measurement unit 18;
standalone server unit 19;
evaluation unit 20;
display unit 21;
protocol tester 22;
simulation unit 23;
memory unit 24.

The RF measurement and evaluation unit 17 is designed to test the mobile communications properties of the mobile communications terminal 3 under test. For this purpose, the signals captured by the test apparatus 1 via the interface 12 and the test unit 16 are measured and evaluated with respect to the parameters under investigation. The RF unit 17 can be used for example to determine the RF resources needed in the mobile communications network over a defined time period. In addition, the quality of the radio interface between mobile communications terminal 3 and test apparatus 1 can be measured and evaluated.

In performing such an RF test, a connection is established between the test apparatus 1 and the mobile communications terminal 3, and then specific test procedures and routines are carried out in order to verify in particular that the transmit and receive capability of the mobile communications terminal 3 complies with the specifications required for proper operability. The test involves testing for example the functionality and performance of the mobile communications terminal 3, the data transfer and, for example, also the interoperability with other mobile communications terminals 3. During the test, the mobile communications terminal 3 under test receives, interprets and processes signals, and transmits back response signals which are detected by the receiver in the test apparatus 1. The test apparatus 1 interprets these signals and compares them with the expected values and signals.

A typical measurement and analysis as part of the RF test is the analysis of the bit error rate, which can be used to verify the functionality and quality of a radio transmission component of the mobile communications terminal 3. For example for this purpose, data is transmitted from the test apparatus 1 to the mobile communications terminal 3, and then transmitted back again from the mobile communications terminal 3 to the test apparatus 1. This data can then be checked to ensure it has not been corrupted. Moreover, as a result, measurement results for different parameters can be displayed, stored and/or printed out in a test report. In particular, a simplified overall result of the test can also be output, for instance test passed or test not passed.

The measurement unit 18 is used for the purpose of evaluating the IP-based communication between test apparatus 1 and Internet 5. In the case of a data-communications connection between a mobile communications terminal 3 under test and the Internet 5, it is possible to determine the number of IP communications links used for this purpose. Furthermore, it is also possible to measure the resultant power consumption in the mobile communications terminal 3, for example by means of a suitable test line 6 between test apparatus 1 and mobile communications terminal 3. Finally, it is also possible to measure by means of the measurement unit 18 the data volume produced by a data transfer, for example over a defined time period.

The standalone server unit 19 can be used to simulate various communications partners (servers) which are activated by a currently active application in the mobile communications terminal 3. For example, it is possible here to simulate inside the test apparatus 1 various communications partners such as, for instance, VoIP, FTP, HTTP, NMS, email and the like. By means of this unit, it is possible to test via the standalone server unit 19 an application that is activated on the mobile communications terminal 3 under test even without direct access to the Internet 5.

The evaluation unit 20 can be used to evaluate the data and signal sequences captured in a data transfer with regard to specific parameters. The data evaluated in this way, or at least some of said data, can be displayed in suitably prepared form on a visual display unit 21 provided specifically for the purpose. The function of the display unit 21 is described in greater detail below with reference to a specific example in FIG. 4.

The evaluation unit 20 is additionally connected to the device-external processing unit 14 via a connecting line 25 and the third interface 10. By this means it is possible to route to a device-external computer at least some of the captured test data or at least some of the already analysed and evaluated analysis data. This is advantageous when for example only a pre-analysis or pre-evaluation takes place in the test apparatus 1 according to the invention.

The protocol tester 22 is used for the purpose of testing different data transferred in a data transfer between mobile communications terminal 3 and Internet 5 with regard to the protocols used in the data transfer. Thus the test apparatus 1 according to the invention is able to test different protocols for a data transfer, such as for instance the IPv4 protocol, IPv6 protocol or even mixed IPv4/Ipv6 protocols.

The simulation unit 23 can be used to simulate various test scenarios. In particular, it is possible in this case to simulate, for instance, interference in the data transfer resulting from superimposed noise signals, data packet losses, jitter, fading and the like. The mobile communications terminal 3 under test can thus also be optimised under real conditions, which by their nature can be subject to a variety of interference.

The test unit 16 also comprises a memory unit 24. Signals captured by the measurement unit 18 and/or by the RF measurement and evaluation unit 17 can be stored in the memory unit 24, which can be embodied for example as a hard disk, flash memory, DRAM, SRAM, EPROM etc. In addition, information that was generated by the evaluation unit 20 as part of the test can also be stored there.

The operating principle of a test apparatus 1 according to the invention and of the test unit 16 provided therein is explained below.

Since unlike the RF measurement, the IP communication of a data transfer cannot take place solely in the test apparatus 1 but requires the Internet 5, the individual data packets of a data transfer are routed to the Internet 5 via the test apparatus 1 according to the invention and analysed in this way. This analysis is preferably, but not necessarily, performed entirely passively, i.e. (practically) without modifying the data and signals and without affecting the data link between the mobile communications terminal 3 and the Internet 5.

According to the invention, in the test apparatus 1 according to the invention, the IP analysis can be combined with separate RF measurements carried out in parallel, wherein correlation between the information obtained in this way can be carried out. For example, the following correlations can be carried out here:

The data volume produced in a data transfer between a mobile communications terminal 3 under test and Internet 5 is measured. In addition, the power consumption required therefor by the mobile communications terminal 3 under test is measured over a defined time period. The information thus obtained about the data volume is correlated with the information thus obtained about the power consumption, and the information is displayed in a suitable manner.

In addition, the number of IP connections required for a data transfer between mobile communications terminal 3 under test and Internet 5 can also be determined. Again in this case, the power consumption required therefor by the mobile communications terminal 3 can be measured over a defined time period. This information about the number of IP connections can likewise be correlated with the information about the power consumption required therefor, and the information can likewise be displayed in a suitable manner.

Instead of the power consumption, the RF resources required therefor in the mobile communications network can also be measured over a defined time period, and the information obtained therefrom can be correlated with the information about the IP connections used, and displayed.

Furthermore, it is also possible to correlate the measured power consumption for different communications links with influencing factors of the mobile communications network. This analysis and correlation can be performed, for instance, with respect to one or more OSI layers of a data transfer.

Figure 3:
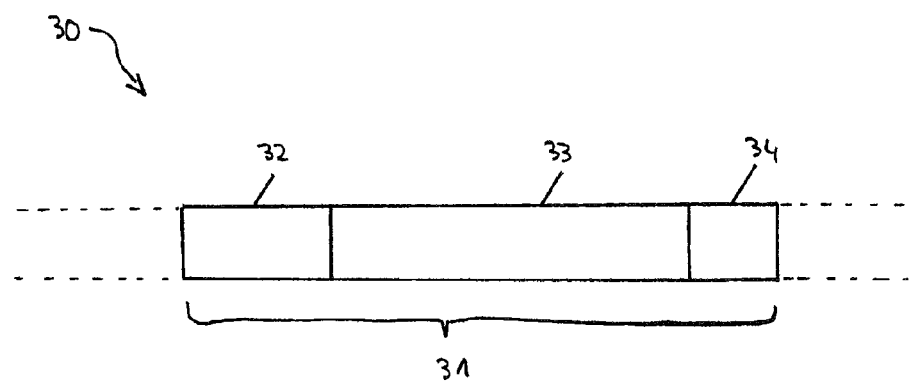
FIG. 3 shows the structure of an example data packet.

FIG. 3 shows the structure of a data packet of a signal sequence, as exists, for instance, in an IP-based communication between mobile communications terminal 3 and Internet 5. An IP-based data communication typically is packet-based. Such a packet-based signal sequence 30 typically comprises a multiplicity of successively arranged data packets 31. A data packet 31 here comprises a header 32 and a data field 33, to which can be attached for example a trailer 34.

In information technology, the term header 32 refers to additional data (what is known as "metadata") that is arranged at the beginning of a data packet 31 and is additional to the payload provided in the data field 33. This additional data contained in the header 32 is used for controlling the data transfer and can, for example, specify the processing of the data. Thus the header 32, for instance, contains information about the data format used, the address information for a data packet 31, protocol data used, coding data used, information that characterises the data (e.g. author of the data, or licence used).

In the analysis options described above, the captured and evaluated data packets 31 are placed in context with other parameters. In addition in this evaluation, power and efficiency figures are determined, which are intended to characterise the data transfer between the mobile communications terminal 3 under test and the Internet 5. This data can then be stored in a database, for example in the memory unit 24 of the test apparatus 1. Additionally or alternatively, it is also possible to prepare the test data analysed in this way visually for the purpose of display and to display same visually via the display unit 21. This is described briefly with reference to the following example in FIG. 4.

FIG. 4 shows an example of the output from a power analysis result using a visual output unit. In the figure, the first column 40 denotes the serial number of a data transfer. The second column 41 denotes the data throughput (units "kbit/s") of a respective data transfer. The third column 42 displays the "TCP window", which contains information about whether or not a data transfer contains packet losses. "FULL" is used here to indicate that a TCP window is already full and thus was not able to receive any further data packets. It can be concluded from this, for example, that data packets may have been lost during the corresponding data transfer. The fourth column 43 contains information about whether it is required to retransmit the data (NOK=Not OK) or whether transmission is successful (OK). The last column 44 contains information about the efficiency of the data transfer. Here is displayed, for example visually, the relationship between the header 32 and the data field 33 and hence whether the data transfer was efficient.

Furthermore, it would also be possible to display additional or possibly also other information which is meant to provide a very clear visual indication as to how to assess the quality of the data transfer.

In the example shown in FIG. 4, a quasi digital display representation (OK↔NOK; OK↔FULL) has been selected for the sake of simplicity, because while the test apparatus 1 is running, this is the clearest representation and is the easiest representation for a user to absorb. Obviously it would also be possible to output the corresponding measurements or analysis data instead of the bare digital information.

Although the present invention has been described above with reference to preferred embodiments, it is not restricted to said embodiments but can be modified in numerous different ways.

In particular, the test apparatus 1 according to the invention, and more precisely the test unit contained therein, does not need to comprise all the functional units denoted by reference signs 17-24. It would also be possible to provide just a few of these functional units.

The expression "mobile communications terminal" used in the present description can be understood to include any devices that have an integrated mobile communications functionality, irrespective of whether further functionalities are integrated in these devices. Thus, for instance, mobile communications terminals can be understood to include in addition to conventional mobile phones also smartphones, tablet PCs, for example also mobile computers, navigational devices, PDAs (Personal Digital Assistants) and the like. Such a mobile communications terminal is also generally referred to as "user equipment".

Furthermore, the present invention shall also not be restricted to the above-stated protocols and standards, which are merely intended to aid explanation.

Finally, the specified numerical figures shall be understood to be purely illustrative and shall not restrict the invention in that respect.

LIST OF USED REFERENCE NUMBERS 1 test apparatus
2 radio interface
3 mobile communications terminal, DUT
4 hard-wired (DSL) connection
5 Internet
6 measurement line, test line
10-12 communications interfaces
13 terminal
14 device-external processing unit
15 connecting line
16 test unit
17 RF measurement and evaluation unit
18 measurement unit
19 standalone server unit
20 evaluation unit, analysis unit
21 display unit
22 protocol tester
23 simulation unit
24 memory unit
25 connecting line
30 signal sequence
31 data packet
32 header
33 data field
34 trailer
40-44 columns

The invention claimed is:

1. A test apparatus for testing IP-based mobile communications terminals, the test apparatus comprising:
a first communications interface via which the test apparatus can be connected to an Internet;
a second communications interface via which the test apparatus can be connected to an IP-based mobile communications terminal under test; and
a test unit, which is designed to test IP-based applications provided in a mobile communications terminal under test that is connected to the Internet via the first and second communications interfaces;
wherein the test unit comprises a measurement unit that is designed to measure at least one of following items of information for a mobile communications terminal under test that is connected to the Internet:
a number of IP communications links established by the mobile communications terminal under test;
a power consumption resulting from an active IP application in the mobile communications terminal under test; and a data volume produced by an active IP application in the mobile communications terminal under test over a specified time period.

2. The test apparatus of claim 1, wherein the test unit comprises an RF measurement/evaluation unit which is designed to test RF properties of the mobile communications terminal under test that is connected to the test apparatus via the second communications interface.

3. The test apparatus of claim 1, wherein the test unit is designed to test the behaviour of an IP-based mobile communications terminal under test under various underlying conditions.

4. The test apparatus of claim 1, wherein the test unit comprises at least one standalone server unit wherein at least one of these standalone server units is designed to simulate in-device a function of a communications partner assigned to an IP application.

5. The test apparatus of claim 1, wherein the test unit comprises an analysis or an evaluation unit which is designed to evaluate on a basis of specified parameters, signal sequences captured in a data transfer between an (P-based mobile communications terminal under test and the Internet.

6. The test apparatus of claim 5, wherein a signal sequence of a data transfer between an IP-based mobile communications terminal under test and the Internet comprise data packets, and wherein the evaluation unit is designed to extract the data packets from the signal sequence and to evaluate the data packets extracted in this way.

7. The test apparatus of claim 5, wherein an IP-based signal sequence comprises a multiplicity of data packets which each comprise a header and a data field and wherein the evaluation unit is further designed to evaluate contents of the header and to place said contents in context with the captured signal sequence.

8. The test apparatus of claim 1, wherein the test unit comprises a selection unit which is designed to make a selection of test parameters used for the test of the mobile communications terminal, and wherein the test unit further comprises a visual output unit which is designed for visual output or display of the analysis data assigned on a basis of the selected test parameters.

9. The test apparatus of claim 1, wherein the test unit is connected to a third communications interface, to which can be connected a device-external unit and via which captured test data or analysis data can be routed as required to the connected device-external unit.

10. The test apparatus of claim 1, wherein the test unit comprises a protocol tester which is designed to test protocols of various active IP applications.

11. The test apparatus of claim 1, wherein the test unit comprises a simulation unit which is designed to simulate at least one test scenario selected from the group consisting of data packet losses in a signal sequence, interference superimposed on the signal sequence, fading, and jitter.

12. The test apparatus of claim 1, wherein the test unit is designed to activate actively an IP-based mobile communications terminal.

13. A test apparatus for testing IP-based mobile communications terminals, the test apparatus comprising:
a first communications interface via which the test apparatus can be connected to an Internet;
a second communications interface via which the test apparatus can be connected to an IP-based mobile communications terminal under test; and
a test unit, which is designed to test IP-based applications provided in a mobile communications terminal under test that is connected to the Internet via the first and second communications interfaces;
wherein the test unit comprises a measurement unit that is designed to measure at least one item of information for a mobile communications terminal under test that is connected to the Internet selected from a group consisting of:
a number of IP communications links established by the mobile communications terminal under test;
a power consumption resulting from an active IP application in the mobile communications terminal under test; and
a data volume produced by an active IP application in the mobile communications terminal under test over a specified time period.

* * * * *